United States Patent [19]
Baker

[11] Patent Number: 5,172,229
[45] Date of Patent: Dec. 15, 1992

[54] SYNC VECTOR GENERATOR FOR COMPOSITE VECTORSCOPES

[75] Inventor: Daniel G. Baker, Aloha, Oreg.

[73] Assignee: Tektronix, Inc., Wilsonville, Oreg.

[21] Appl. No.: 618,128

[22] Filed: Nov. 26, 1990

[51] Int. Cl.$^5$ .............................................. H04N 17/02
[52] U.S. Cl. ..................................... 358/139; 358/10; 358/158
[58] Field of Search .................... 358/10, 17, 158, 159, 358/325, 326, 139; 324/88, 83 A, 83 D

[56] References Cited

U.S. PATENT DOCUMENTS

| | | | |
|---|---|---|---|
| 4,470,064 | 9/1984 | Michener | 358/10 |
| 4,788,585 | 11/1988 | Suzuki | 358/10 |
| 4,881,121 | 11/1989 | Judge | 358/10 |
| 5,010,403 | 4/1991 | Wardzala | 358/10 |

Primary Examiner—Howard W. Britton
Assistant Examiner—Kim Yen Vu
Attorney, Agent, or Firm—Francis I. Gray

[57] ABSTRACT

A sync vector generator for a composite vectorscope generates a gate from the horizontal sync pulses of a video input signal as a function of a reference signal selected from either the video input signal or an external reference signal. The gate width is equal to an integer multiple of cycles of the subcarrier frequency for the video input signal. A high-Q resonant tank circuit tuned to the subcarrier frequency is activated by the gate to produce a burst signal having a frequency equal to the subcarrier frequency and having a number of cycles equal to the integer multiple. The burst signal is input together with quadrature subcarrier frequency components to the demodulators of a conventional vectorscope to produce an output display that is a measure of horizontal sync jitter and instantaneous SC/H phase.

8 Claims, 6 Drawing Sheets

SYNC VECTOR GENERATOR FOR COMPOSITE VECTORSCOPES

BACKGROUND OF THE INVENTION

The present invention relates to the measurement and display of video signals, and more particularly to a sync vector generator for composite vectorscopes for measuring the horizontal sync jitter of a video signal in degrees of a subcarrier cycle.

For television video signals it is often desired to measure the horizontal sync jitter of the video signal, as well as the phase relationship between horizontal sync and subcarrier color burst (SC/H phase measurement). To measure horizontal sync jitter on a conventional oscilloscope/waveform monitor to a desired accuracy of less than one nanosecond is difficult since the sync triggering in a conventional oscilloscope is not optimized for triggering on the sync of a video signal. Some of the newer oscilloscopes have specialized video triggers, but the jitter and average picture level (APL) sensitivity are not good enough to evaluate sync timing in the few nanoseconds range. In addition most oscilloscopes do not have sweeps faster than 10 nsec/div whereas a vectorscope, which is specially designed to display television signals, can resolve one nanosecond subcarrier timing, approximately 1.5 degrees, easily. Also it is sometimes convenient to measure the jitter in terms of subcarrier degrees since television genlock systems occasionally must lock a subcarrier related oscillator, or subcarrier synchronous sample clock, to a television horizontal sync source. In this case, as well as others, it is desirable to quantify the jitter in terms of subcarrier phase in degrees to allow mapping directly into chroma hue errors of a composite video signal, chroma being conveniently expressed in terms of degrees.

Many digital video signal processors, either component or composite, have sync locked clocks and it is often necessary to evaluate the analog sync output jitter with respect to a house composite reference, as disclosed in co-pending U.S. Pat. No. 5,010,403 issued Apr. 23, 1991 to Edward D. Wardzala entitled "Measurement of Timebase Jitter for Component Video." This is accomplished with a sync vector display when the vectorscope is externally referenced. The input signals may be component, i.e., without a color burst component, and the sync jitter can be evaluated directly in subcarrier degrees.

For SC/H phase measurement conventional SC/H phase indicators average a large number of sync edges together, the sync edge being defined as the fifty percent (50%) point on the leading edge of the horizontal sync pulse, to display some average SC/H phase. This masks or at least reduces any large SC/H phase error that occurs sporadically for only a few or even a single line.

Therefore what is desired is a measurement apparatus that provides a measure of horizontal sync jitter in degrees of the subcarrier frequency as well as line by line SC/H phase measurements.

SUMMARY OF THE PRESENT INVENTION

Accordingly the present invention provides a sync vector generator for composite vectorscopes that displays horizontal sync jitter of a video signal in degrees of the subcarrier frequency as well as provides a line by line display of SC/H phase. A video signal received by a vectorscope drives a fifty percent (50%) sync point detector to generate a series of sync pulses corresponding to the horizontal sync pulses of the video signal. The video signal also drives an SC/H phase detector to determine within +/−90 degrees the SC/H or color frame of the video signal. When an external reference is used, this external SC/H phase detector provides the needed color frame information to allow the sync vector display to indicate the SC/H phase over a full 360 degrees. The output of the sync point detector is used to generate a gate pulse having a duration equal to an integer number N of the subcarrier frequency cycles. This pulse drives a relatively high-Q resonant tank circuit that is tuned to the subcarrier frequency. The output of the tank circuit is a burst of N cycles of subcarrier frequency similar to the color burst but triggered by sync. The burst is time multiplexed or added with the video signal at the input of the vectorscope demodulators. The resulting display on the vectorscope provides a vector configuration with the axis of the vector representing instantaneous SC/H phase and the distribution of many overlayed vectors representing the realtime horizontal sync jitter.

The objects, advantages and other novel features of the present invention are apparent from the following detailed description when read in conjunction with the appended claims and attached drawing.

DESCRIPTION OF THE PREFERRED EMBODIMENT

Figure 1:
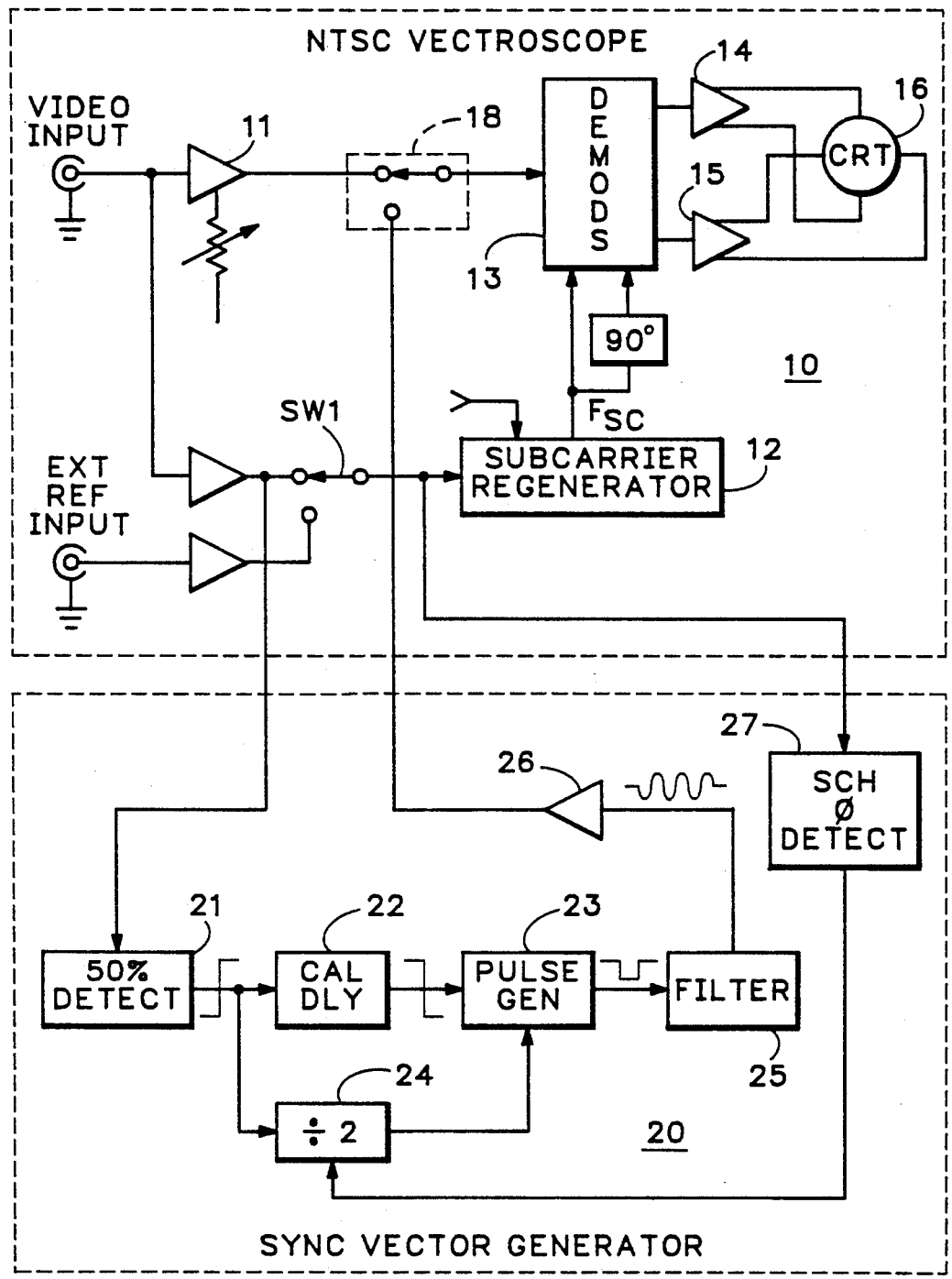
FIG. 1 is a block diagram view of a sync vector generator with an NTSC vectorscope according to the present invention.

Referring now to FIG. 1 a conventional vectorscope 10 is shown having a sync vector generator 20 according to the present invention. The vectorscope 10 includes an input video amplifier 11, a subcarrier regenerator 12, demodulators 13, vertical and horizontal deflection circuits 14, 15 and a display device 16. The subcarrier regenerator 12 generates a subcarrier frequency signal, Fsc, from the color burst component of the video input signal and applies Fsc together with a quadrature phase shifted Fsc to the demodulators 13. The demodulators 13 mix the video input signal from the video amplifier 11 with the quadrature Fsc signals to produce horizontal and vertical chroma signals that drive the deflection circuits 14, 15 in order to produce the conventional vectorscope display on the display device 16. The Fsc signal may be derived from an external reference signal via an operator selected switch SW1 to show the instantaneous subcarrier and sync phase difference between the video signal and "house" sync.

The sync vector generator 20 includes a fifty percent (50%) sync point detector 21, such as that disclosed in U.S. Pat. No. 4,585,989 issued Apr. 29, 1986 to Earl G. Matney entitled "50% Point of Amplitude and Phase Detector", a calibrated non-retriggerable box-car delay circuit 22, a pulse generator 23, a divider 24, a filter 25 and an output amplifier 26. The video input signal is input to the 50% detector 21 to generate a signal that is synchronized to the horizontal sync signal of the input signal. The sync signal from the detector 21 is input to both the non-retriggerable box-car delay circuit 22 and the divider 24. The holdoff delay of the non-retriggerable delay circuit 22 is just less than two horizontal line intervals, 2H, to lock out 31.5 kHz triggers from equalizers and vertical serrated pulses. Also a small calibrated box-car delay, about 500 nsec, is used to calibrate the SC/H display. An SC/H phase detector 27 receives either the video input signal or the external reference signal, as determined by the status of the switch SW1, and determines within +/−90 degrees the SC/H phase of such input signal. When an internal reference is selected by the switch SW1, the divider 24 is not activated and the SC/H phase of the reference signal is not important. However when external reference is selected by the switch SW1, the divider 24 is activated and only one of the two sync vectors, zero and 180 degrees, for NTSC or one of the four sync vectors, zero, ninety, 180 and 270 degrees, for PAL is displayed providing a single vector indication over a full 360 degrees. The SC/H phase of the external reference signal is detected to determine which of the sync vectors to delete so that the remaining vector indicates color frame information relative to the external reference signal. By using a video switcher at the input to the vectorscope 10 relative sync, burst and color frame phasing of a plurality of selected inputs may then be compared to a common external or "house" reference, and by inference to each other.

The output of the phase detector 27 enables the divider 24 to generate a gate pulse that is applied to the pulse generator 23. The pulse generator 23 outputs a delayed pulse from the delayed sync signal when enabled by the gate pulse. The delayed pulse has a pulse width that is an integer N multiple of subcarrier frequency cycles. The delayed pulse drives a relatively high-Q tank circuit that forms the filter 25 which is tuned to the subcarrier frequency. The output of the filter 25 is a burst signal having an integer number of cycles at the subcarrier frequency. This burst signal is input to the output amplifier 26 and applied to the video input of the demodulators 13, either as an addition to the video input signal or via a multiplexer 18. The amplitude and frequency of the burst signal are calibrated to provide thin vectors or dots on the display 16 extending to the compass rose of the vectorscope display.

Figure 2:
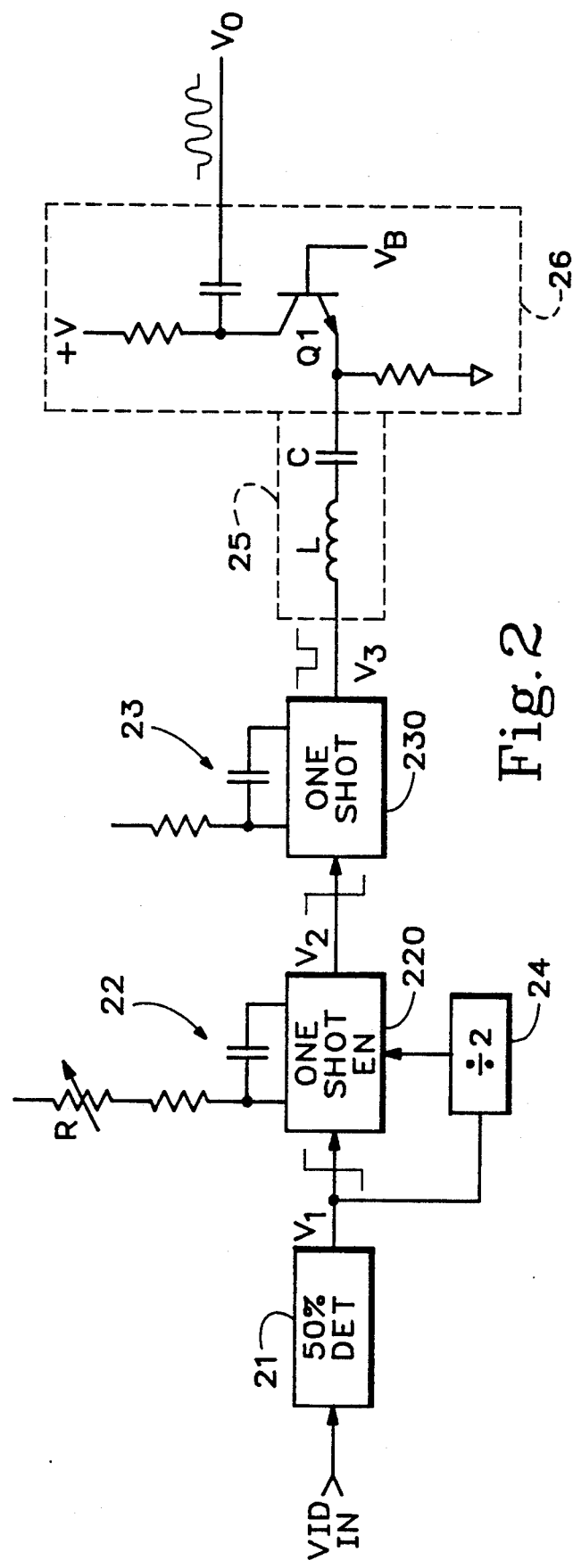
FIG. 2 is a block/schematic diagram view of the sync vector generator of FIG. 1.
Figure 3:
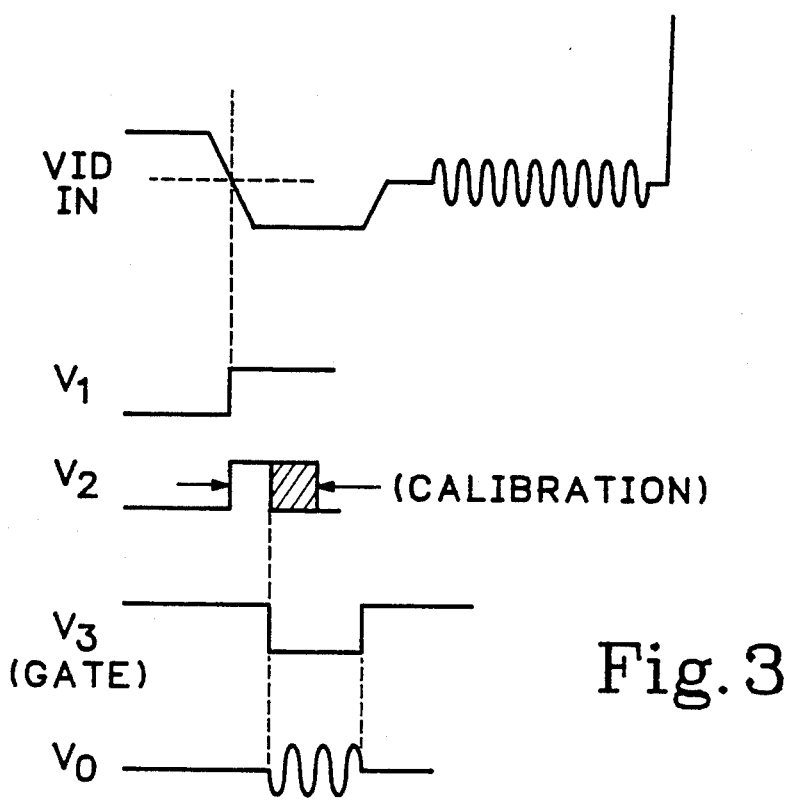
FIG. 3 is a timing diagram view illustrating the operation of the sync vector generator of FIG. 2.
Figure 6:
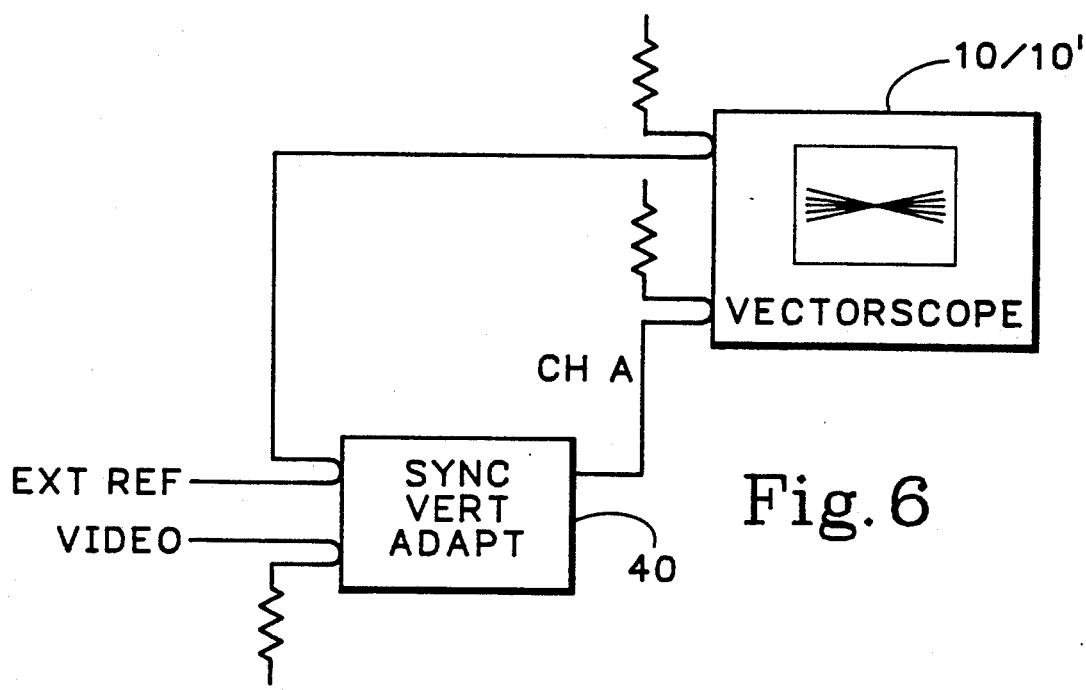
FIG. 6 is a block diagram view of the configuration of a sync vector adaptor for a vectorscope according to the present invention.

As shown in FIGS. 2 and 3 the output V1 from the 50% detector 21 is a positive going pulse. The leading edge of V1 triggers a one-shot multivibrator 220 that forms the delay circuit 22 when enabled by the output from the divider 24. Thus the one-shot multivibrator 220 provides the delayed sync signal V2 every other horizontal sync pulse when external reference is selected. The pulse width of V2 is variable according to a variable resistor R in the one-shot 220 circuit to calibrate the display. The trailing edge of V2 triggers another one-shot multivibrator 230, the box-car delay, that serves as the pulse generator 23. The pulse one-shot 230 has a fixed pulse width equal to the desired integer multiple N of subcarrier frequency cycles. The delayed pulse signal V3 causes the filter 25, formed by a series high-Q LC tank circuit that is tuned to the subcarrier frequency, to output a sinusoidal a.c. current that has a frequency equal to that of the subcarrier frequency. A transistor Q1 in the output amplifier 26 converts the a.c. current from the filter 25 into an a.c. voltage which is the burst signal Vo having N cycles at the subcarrier frequency.

Figure 4:
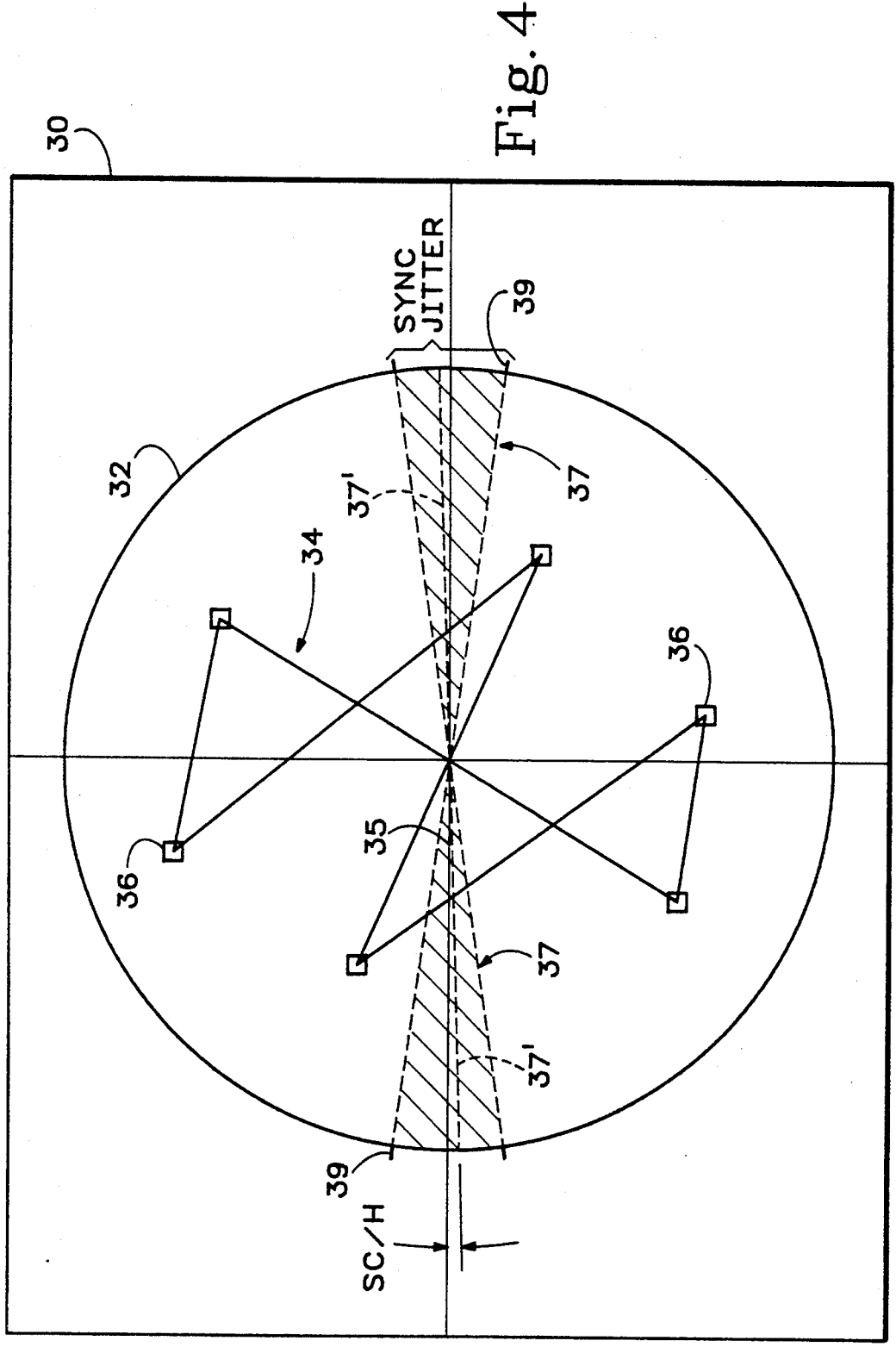
FIG. 4 is a plan view of the display of the vectorscope showing the horizontal sync jitter/SC/H display produced by the sync vector generator of FIG. 2.

As shown in FIG. 4 a display screen 30 has a vectorscope compass rose 32 superimposed on it. A conventional color bars vectorscope display 34 is shown together with benchmark points 36 corresponding to specific colors. A burst mark 35 is shown along the zero axis. A vector display 37 +/−180 degrees when internal reference is selected is produced by the sync vector generator 20 of the present invention. The extreme tips 39 of the vector 37 indicate sync phase on a line-by-line basis as a function of degrees of subcarrier phase. The distribution of many overlayed vectors 37 is a measure of the horizontal sync jitter. The phase relationship between the average sync vector 37' and the burst vector 35 is the SC/H phase.

Figure 5A:
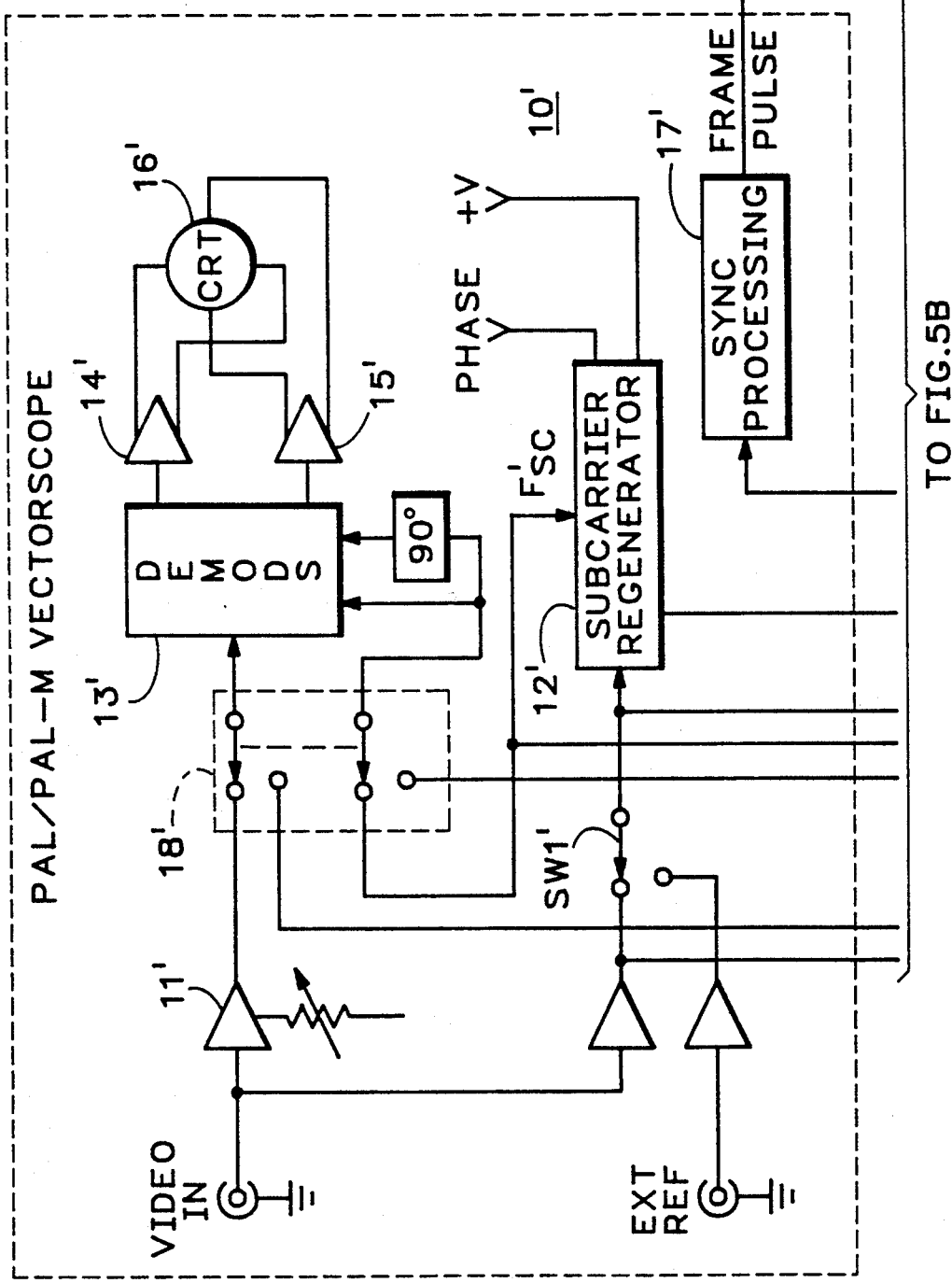
FIGS. 5A and 5B are block diagram view of a sync vector generator with a PAL vectorscope according to the present invention.
Figure 5B:
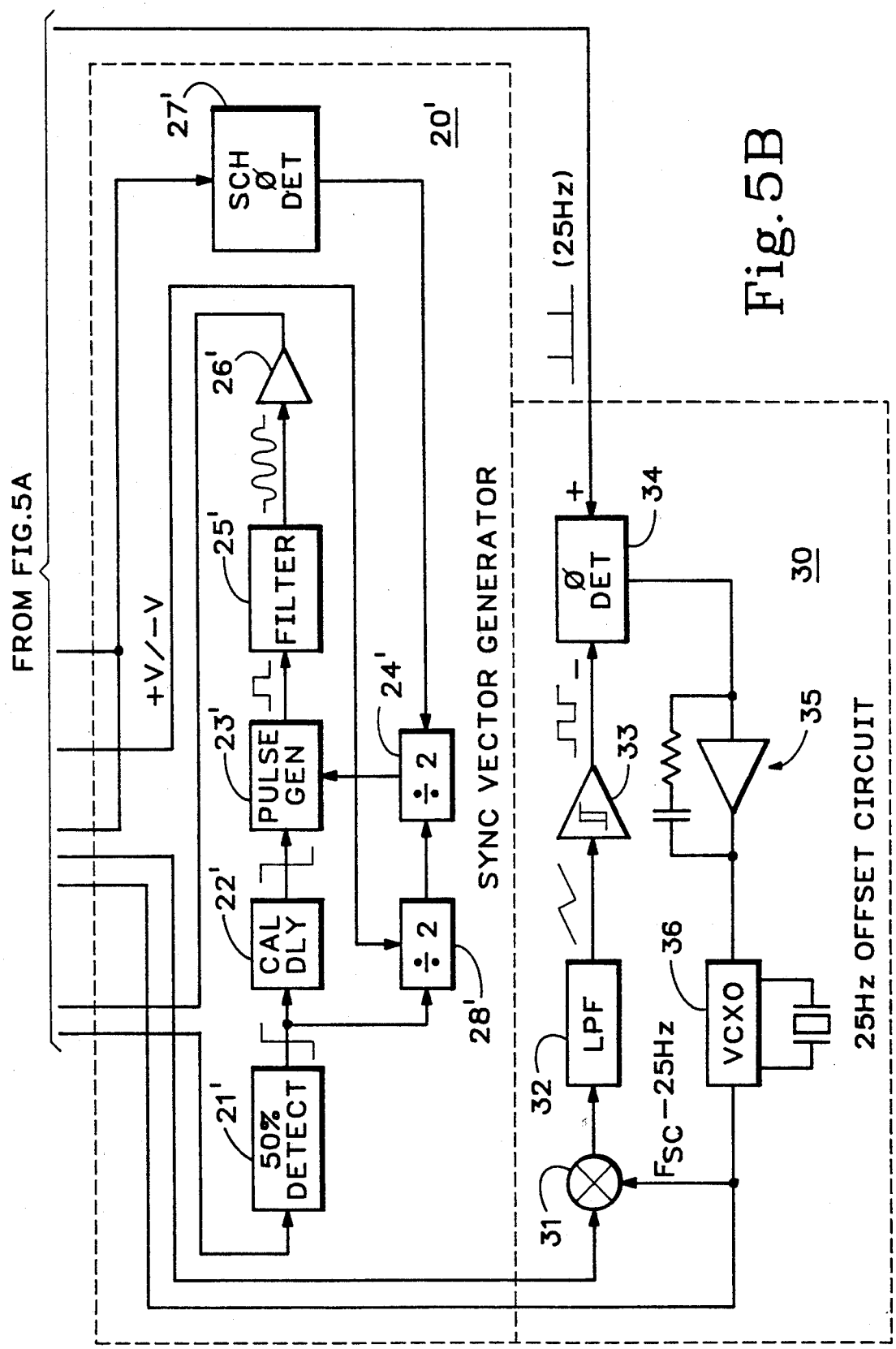

A PAL vectorscope 20', as shown in FIG. 5, is similar in basic architecture to the NTSC vectorscope 20 shown in FIG. 1. The video input signal is applied to a video input amplifier 11' and via switch SW1, to a subcarrier regenerator 12'. The subcarrier frequency Fsc' from the subcarrier regenerator 12' is applied to demodulators 13' together with the video input signal from the input amplifier 11'. The resulting chrominance components are input to respective horizontal and vertical drive circuits 14', 15' to provide the vectorscope display on a display device 16'. The reference signal from the switch SW1' is also input to a sync processing circuit 17' to produce a frame pulse signal.

The sync vector generator 20' operates in much the same manner as described earlier for the sync vector generator 20 of FIG. 1. An additional divider 28' is provided, since PAL is an eight field frame as opposed to the four field frame of NTSC. The burst pulse Vo is always divided by two as determined by the +V/−V phasing already detected in the PAL subcarrier regenerator 12'. In NTSC the color subcarrier is an odd multiple of one-half the sync frequency, and in fact lies between the 227th and 228th harmonic of the horizontal frequency, which is the 455th harmonic of one-half the horizontal frequency. When mixed with sync in a vectorscope demodulator, a one-half horizontal frequency beat is produced. The sync vector is a small sample, approximately one microsecond, of the H/2 beat. If the sync vector gate pulse occurs every horizontal line, the beat occurs in two places 180 degrees apart since the beat period is two horizontal line time intervals. Additionally if the two points are at the beat's zero crossings, zero and 180 degrees relative to burst, the input signal has the correct SC/H phase. Relative to a second input signal also properly adjusted for proper SC/H phase, this first signal may or may not be in the same color frame, i.e., the bursts could be 180 degrees out or the syncs 140 nsec delayed if in the opposite color frame. One of the two sync vectors can be deleted according to an independent, external reference signal of constant SC/H phase to unambiguously determine the relative color frame of a plurality of selected input signals. The relative color frame of the external reference signal to the selected input signals may not be important.

In PAL the color subcarrier is different from NTSC in two ways: 1) it is an odd multiple of one-quarter the horizontal frequency, and 2) it is shifted 25 Hz higher in frequency. The first difference creates a beat note with the sync vector in the vectorscope that has a period of four horizontal lines. A sync vector burst that occurs every line generates in the demodulator output a sample of the beat every ninety degrees as opposed to 180 degrees in NTSC. A PAL vectorscope must decode the line alternate +V component of burst to make the popular +V display. This H/2 signal is used to provide a sample of the beat every other line yielding only two vectors at zero and 180 degrees as in NTSC. This provides the two sync vectors that make up the vector output signal as in the NTSC case. The other divider is phased by the output of the SC/H phase detector 27' and provides a single sync vector when the external reference signal is used as the reference signal for indicating relative color frame as in NTSC.

The PAL color subcarrier has a 25 Hz offset that needs to be removed when displaying the sync vector. The 25 Hz beat is such that the SC/H phase can only be defined on one line of the 625 lines in the frame. This causes the sync vectors to rotate in phase 1/625 of a cycle every line. Line select mode would allow measurement of the SC/H phase, but sync jitter is difficult since only one line per frame is displayed. Therefore the PLL circuit 31–36 effectively subtracts the 25 Hz offset synchronously with the frame sync to create a new subcarrier signal that is only used to demodulate the sync vector burst. This allows an overlay of many sync vectors throughout the frame for real-time jitter evaluation as in NTSC.

The phase shifted subcarrier frequency Fsc' from the subcarrier regenerator 12' is only used by the demodulators 13' when the multiplexer switch 18' is selecting the video input signal. When the top half of the multiplexer 18' is selecting the sync burst signal from the sync vector generator 20', the phase shifted subcarrier frequency offset by 25 Hz by the offset circuit phase locked loop 30 is selected by the bottom half of the multiplexer. The monochrome frame information of the selected reference signal from the sync processing circuit 17' is used to synchronize the offset. The subcarrier frequency Fsc' is input to a mixer 31 to which also is input an offset subcarrier frequency, Fsc'−25 Hz, from a voltage controlled crystal oscillator (VCXO) 36. The resulting 25 Hz signal is input to a lowpass filter 32 and then to a hysteresis comparator 33 to produce a 25 Hz square wave signal. A phase detector 34 compares the 25 Hz square wave signal with the frame pulse signal and generates an error signal. The error signal is integrated by an error amplifier 35 and applied as a control signal to the VCXO 36.

Although the present invention is described as an integral part of a vectorscope, a sync vector adaptor 40 may be used to adapt a conventional vectorscope 10/10' to display horizontal sync jitter according to the present invention. The external reference signal is looped through the sync vector adaptor 40 that includes the circuitry of the sync vector generator 20/20' to the vectorscope, and the video input signal is input to the sync vector adaptor. The resulting burst signal from the sync vector adaptor is input as video channel A to the vectorscope to display the timing jitter display.

Thus the present invention provides a sync vector generator for a composite vectorscope for measuring horizontal sync jitter and instantaneous SC/H phase on the vectorscope by generating a gated burst of subcarrier frequency from the video input signal for input to the demodulators, and further in the case of PAL systems removing the 25 Hz offset from the subcarrier frequency.

What is claimed is:

1. A vectorscope for measuring horizontal sync jitter of a color video signal, the vectorscope being of the type having means for demodulating a pair of color components from the color video signal as a function of the color video signal and quadrature components of a subcarrier frequency and having means for displaying the color components in a vector format, comprising:
   means for generating from the color video signal a horizontal sync triggered burst signal having a frequency equal to the subcarrier frequency; and
   means for combining the burst signal with the color video signal to provide a horizontal sync jitter vector on the displaying means.

2. A vectorscope as recited in claim 1 wherein the generating means comprises:
   means for detecting a 50% point of horizontal sync components of the color video signal to produce a horizontal sync signal; and
   means for generating a gate from the horizontal sync signal that defines the duration of the horizontal sync triggered burst signal.

3. A vectorscope as recited in claim 2 wherein the generating means further comprises:
   means for generating a sinusoidal frequency current at the subcarrier frequency, the sinusoidal frequency current generating means being a function of the gate; and
   means for converting the sinusoidal frequency current into the horizontal sync triggered burst signal.

4. A vectorscope as recited in claim 1 further comprising means for offsetting the subcarrier frequency by a predetermined amount when the horizontal sync triggered burst signal is input to the demodulating means.

5. A sync vector generator for use with a vectorscope for providing a horizontal sync jitter vector display comprises:
   means for generating a gate from a color video signal, the gate having a predetermined time relationship to a horizontal sync signal component of the color video signal; and
   means for generating from the gate a burst signal for input to the vectorscope having a number of cycles determined by the width of the gate, the burst signal having a frequency equal to the subcarrier frequency of the color video signal and being locked to the horizontal sync signal.

6. A sync vector generator as recited in claim 5 wherein the gate generating means comprises:
   means for detecting a 50% point of the horizontal sync signal component to produce a horizontal sync signal; and
   means for generating a gate from the horizontal sync signal that defines the duration of the burst signal.

7. A sync vector generator as recited in claim 6 wherein the burst signal generating means further comprises:
   means for generating a sinusoidal frequency current at the subcarrier frequency, the sinusoidal frequency current generating means being a function of the gate; and
   means for converting the sinusoidal frequency current into the horizontal sync triggered burst signal.

8. A sync vector generator as recited in claim 5 further comprising means for offsetting the subcarrier frequency by a predetermined amount, the offset subcarrier frequency being input to the vectorscope as a reference signal when the burst signal is input to the vectorscope.

* * * * *